United States Patent

Ozutsumi et al.

[11] 3,896,116
[45] July 22, 1975

[54] LACTONE COMPOUNDS DERIVED FROM PYRIDINE-CARBOXYLIC ACIDS AND PROCESS FOR PREPARING THE SAME

[75] Inventors: Minoru Ozutsumi; Yoshihide Miyazawa; Susumu Suzuka, all of Tokyo, Japan

[73] Assignee: Hodogaya Chemical Co., Ltd., Tokyo, Japan

[22] Filed: Mar. 25, 1974

[21] Appl. No.: 454,526

[30] Foreign Application Priority Data
Mar. 23, 1973  Japan.................. 48-32746

[52] U.S. Cl.......... 260/240 D; 260/296 P; 260/335
[51] Int. Cl......................... C07d 7/42; C07d 5/14
[58] Field of Search............ 260/335, 295 A, 240 D, 260/295 A, 296 P, 297 F, 295 SP, 297 T

[56] References Cited
UNITED STATES PATENTS
3,746,562  7/1973  Lin..................... 260/335
3,825,561  7/1974  Akamatsu et al........... 260/240 D X FOREIGN PATENTS OR APPLICATIONS
2,150,797  4/1972  Japan OTHER PUBLICATIONS
Michio et al., "Benzofluoran pressure sensitive dyes" in Chem. Abs., Vol. 75, 1971, 7430x.

*Primary Examiner*—Allen B. Curtis
*Attorney, Agent, or Firm*—Sughrue, Rothwell, Mion, Zinn & Macpeak

[57] ABSTRACT
A lactone compound represented by the following formula

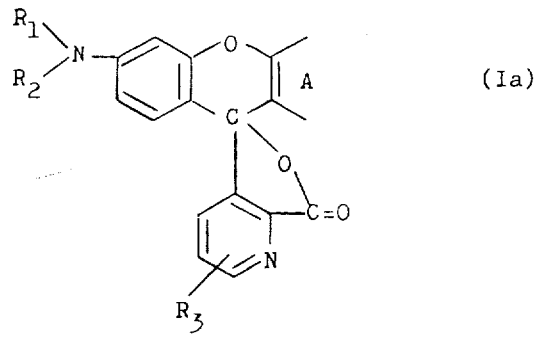

or

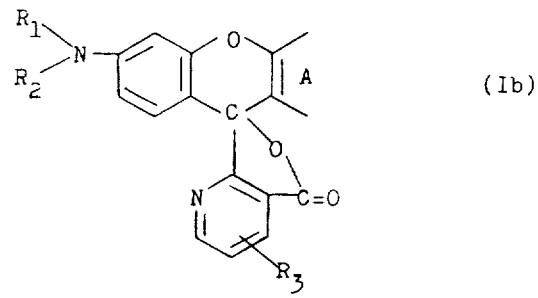

or a mixture thereof, wherein $R_1$, $R_2$, $R_3$ and the partial structure

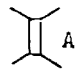

are as defined hereinafter, useful as a color former, and a process for preparing the same are disclosed.

9 Claims, No Drawings

LACTONE COMPOUNDS DERIVED FROM PYRIDINE-CARBOXYLIC ACIDS AND PROCESS FOR PREPARING THE SAME

BACKGROUND OF THE INVENTION

1. Field of the Invention

This invention relates to novel lactone compounds and a process for preparing the lactone compounds, more particularly, this invention relates to novel lactone compounds of the formula (Ia)

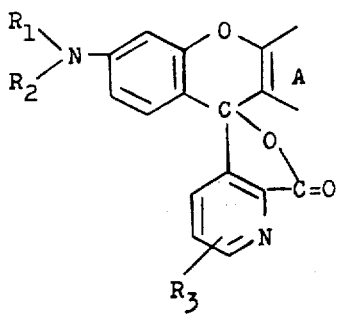

or (Ib)

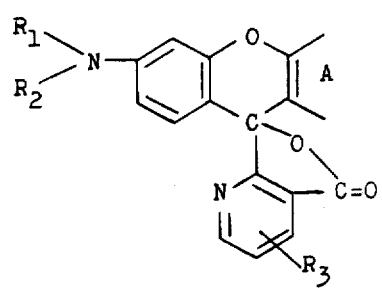

or a mixture thereof, wherein $R_1$ represents a hydrogen atom, a lower alkyl group or a benzyl group, $R_2$ represents a lower alkyl group, a benzyl group or an unsubstituted or substituted phenyl group wherein the substituent is a lower alkyl group or a halogen atom, $R_3$ represents a hydrogen atom, a lower alkyl group, a halogen atom or a phenyl group, and the partial structure

represents a naphthalene residual group of the formula (IVa) or (IVb)

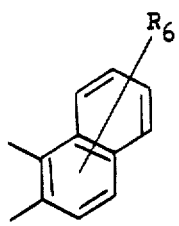
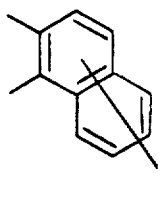

(IVa)      (IVb)

wherein $R_6$ represents a hydrogen atom, a lower alkyl group, a lower alkoxy group, a halogen atom, an amino group, a mono-lower alkylamino group, di-lower alkyl- amino group, a monobenzylamino group, a dibenzylamino group, an N-lower alkyl-N-benzylamino group, an aniline group, an N-lower alkyl-anilino group, a -NHCO-X group wherein X represents a lower alkyl group, a lower alkenyl group, or an unsubstituted or substituted styryl group, an unsubstituted or substituted phenyl group or an unsubstituted or substituted naphthyl group wherein the substituent is a lower alkyl group, a lower alkoxy group, a di-lower alkylamino group, a hydroxy group, a nitro group or a halogen atom, wherein the lower alkyl, alkoxy and alkenyl groups have 1 to 5 carbon atoms, and a process for preparing such lactone compounds. The lactone compounds of this invention are useful as color formers since they are essentially colorless but are capable of developing various colors upon heating or contact with acidic substances.

2. Description of the Prior Art

Hithertofore, the known color formers of this type include Crystal Violet lactones, Malachite Green lactones, rhodamine lactam derivatives, leuco-auramine derivatives, leuco-methylene blue derivatives and indolino-spiropyrane derivatives, leucoauramine compounds of bis(p-substituted aminoaryl)-methane or quaternarized or sulfonated derivatives thereof. However, these well-known compounds have various disadvantages such as a slow color developing rate, a low density of colors, poor light-resistance and weather-resistance of the developed colors and color changes with the lapse of time. Also, these known color formers sometimes shows bleeding of the developed colors and tend to develop colors or to decrease an ability to develop colors during the storage of the color formers.

SUMMARY OF THE INVENTION

An object of this invention to provide novel lactone compounds derived from pyridine-carboxylic acids as color formers which are, per se, substantially colorless but are capable of developing various colors.

Another object of this invention is to provide novel color formers which are stable against sun-light, moisture, oxygen, etc. without easily causing any decomposition or color-development during the storage but are capable of developing various colors rapidly and in high density upon heating or contact with acidic substances thereby producing colors having excellent light-fastness and weather-resistance.

A further object of this invention is to provide a process for preparing such novel lactone compounds derived from pyridine-carboxylic acids.

DETAILED DESCRIPTION OF THE INVENTION

The lactone compounds derived from pyridine-carboxylic acids of this invention represented by the formula (Ia) or (Ib)

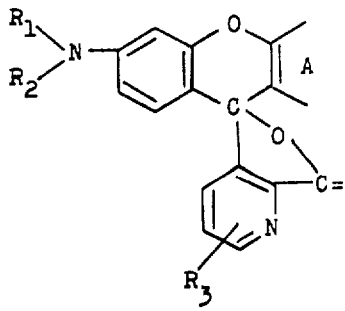

(Ia)

(Ib)

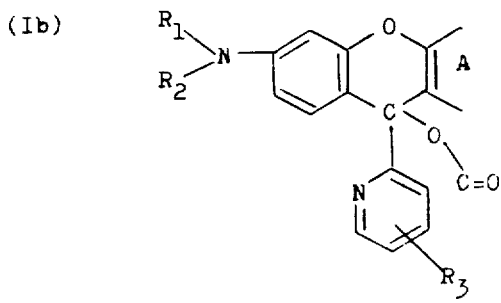

wherein $R_1$, $R_2$, $R_3$ and the partial structure of

are as defined above, can be prepared by condensing a benzoyl-pyridine-carboxylic acid represented by the formula (IIa) or (IIb)

(IIa)

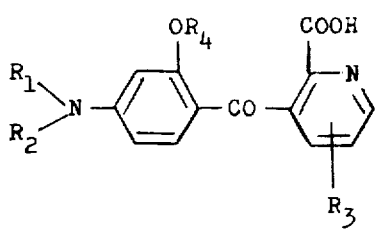

(IIb)

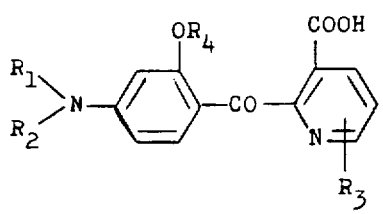

wherein $R_1$, $R_2$ and $R_3$ are as defined above, and $R_4$ represents a hydrogen atom or a lower alkyl group, with a naphthalene compound represented by the formula (III)

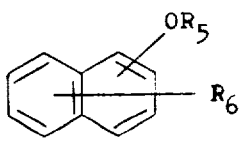

wherein $R_5$ represents a hydrogen atom or a lower alkyl group and the $-OR_5$ group is substituted on 1- or 2-position of the naphthalene ring, and $R_6$ is as defined above.

Alternatively, the pyridine-carboxylic acid lactones of this invention represented by the formula (VIIIa) or (VIIIb)

(VIIIa)

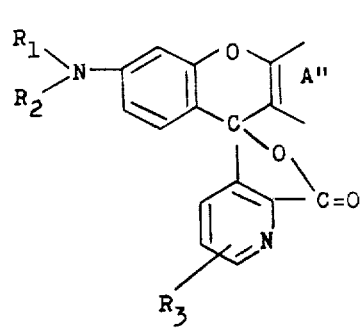

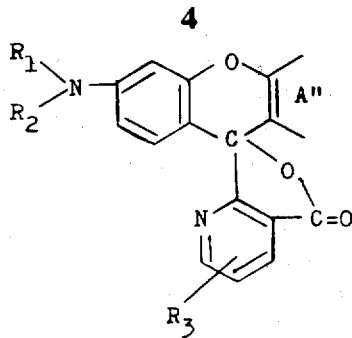

(VIIIb)

wherein $R_1$, $R_2$ and $R_3$ are as defined above, and the partial structure

represents a residue of a naphthalene compound of the formula (IXa) or (IXb)

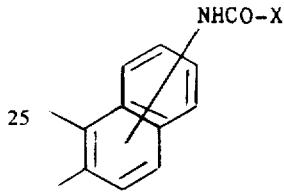    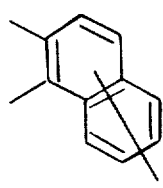

(IXa)            (IXb)

wherein X is as defined above, can be prepared by condensing a pyridine-carboxylic acid lactone, which is prepared by the above-described process, represented by the formula (Va) or (Vb)

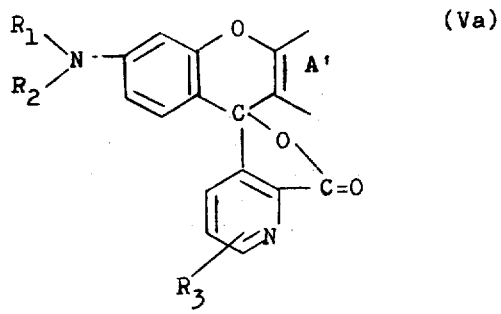

(Va)

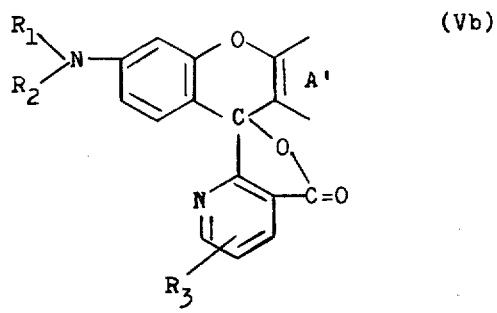

(Vb)

wherein $R_1$, $R_2$ and $R_3$ are as defined above, and the partial structure

represents naphthylamine of the formula (VIa) or (VIb)

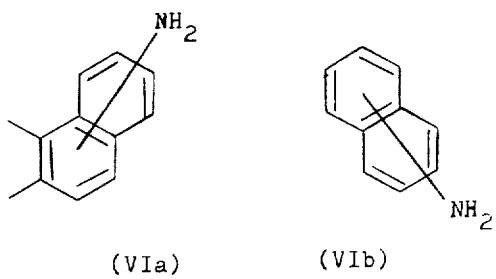

(VIa)  (VIb)

with an acid halide represented by the formula (VII)

$$X - CO - Y \quad \text{(VII)}$$

wherein X is as defined above and Y represents a halogen atom.

The lactone of the present invention is a substantially colorless or slightly colored powder which is stable in atmosphere but undergoes changes in its color to red, purplish red, reddish purple, blue or dark reddish brown by heating. The lactones of this invention as color formers are soluble in or miscible with high molecular weight substances such as animal, vegetable or mineral waxes, ethyl cellulose, polyvinylacetate, rosin-modified alkyd resins and are soluble in a wide variety of organic liquids such as methanol, ethanol, ethyl cellosolve, chloroform, benzene, toluene, chlorobenzenes, alkylnaphthalenes, tri-octylphosphate and the like. The solution of the lactones of this invention in the above organic liquid develop a red, purplish red, reddish purple, blue or dark reddish brown color immediately after the solution is adsorbed on active clay substances such as acid clay, attapulgite, zeolite, bentonite and the like, solid organic acids such as succinic acid, maleic acid, tannic acid, benzoic acid and the like, or acidic polymers such as carboxypolyethylene, phenol-aldehyde polymers, styrene-maleic anhydride copolymers containing residual acidic groups. The color developed on such solid materials generally has a high color density and is characterized by excellent moisture-resistance and light-fastness. Thus, the lactones of this invention are useful as marking color formers for the recording materials such as heat-sensitive copying papers, hectographical printing papers, pressure-sensitive copying papers.

Representative compounds of the benzoyl-pyridine-carboxylic acid represented by the formulae (IIa) and (IIb) used in the present invention are 3- and 2-[2'-oxy-4'-diethylaminobenzoyl]-pyridine-carboxylic acid-(2) and -(3); 3- and 2-[2'-methoxy-4'-dimethylaminobenzoyl]-pyridine-carboxylic acid-(2) and -(3); 3- and 2-[2'-ethoxy-4'-diethylamino-benzoyl]-pyridine-carboxylic acid-(2) and -(3); 3- and 2-[2'-methoxy-4'-(N-methyl-N-benzyl)-aminobenzoyl]-pyridine-carboxylic acid-(2) and -(3); 3- and 2-[2'-methoxy-4'-dibenzylamino-benzoyl[-pyridine-carboxylic acid-(2) and -(3); 3- and 2-[2'-oxy-4'-benzylamino-benzoyl]-pyridine-carboxylic acid-(2) and -(3); 3- and 2-[2'-oxy-4'-anilino-benzoyl]-pyridine-carboxylic acid-(2) and -(3); 3- and 2-[2'-methoxy-4'-(N-methyl-N-phenyl)-amino-benzoyl]- pyridine-carboxylic acid-(2) and -(3); 3- and 2-[2'-oxy-4'-(4''-methyl)-anilino-benzoyl]-pyridine-carboxylic acid-(2) and -(3); 3- and 2-[2'-oxy-4'-(4''-chloro)-anilino-benzoyl]-pyridine-carboxylic acid-(2) and -(3); 3- and 2-[2'-ethoxy-4'-diethylamino-benzoyl]-4-methyl-pyridine-carboxylic acid-(2) and -(3); 3- and 2-[2'-ethoxy-4'-diethylamino-benzoyl]-4-chloro-pyridine-carboxylic acid-(2) and -(3); 3- and 2-[2'-ethoxy-4'-diethylamino-benzoyl]-6-phenylpyridine-carboxylic acid-(2) and -(3); and the like.

Representative compounds of the naphthalene compounds represented by the formula (III) used in the process of this invention are 2-naphthol, 6-n-butyl-2-naphthol, 6-methoxy-2-naphthol, 6-bromo-2-naphthol, 5-amino-2-naphthol, 8-amino-2-naphthol, 5-ethylamino-2-naphthol, 5-dimethylamino-2-naphthol, 5-diethylamino-2-naphthol, 8-diethylamino-2-naphthol, 5-dibenzylamino-2-naphthol, 5-(N-methyl-N-benzyl)-amino-2-naphthol, 5-anilino-2-naphthol, 8-anilino-2-naphthol, 1-naphthol, 4-ethoxy-1-naphthol 4-amino-1-naphthol, 5-amino-1-naphthol, 4-dimethylamino-1-naphthol, 5-dimethylamino-1-naphthol, 5-diethylamino-1-naphthol, 4-benzylamino-1-naphthol, 5-benzylamino-1-ethoxy-naphthalene, 5-(N-methyl-N-benzyl)-amino-1-methoxy-naphthalene, 4-anilino-1-naphthol, 5-dimethylamino-2-methoxy-naphthalene, 4-(N-methyl-N-phenyl)-amino-1-methoxy-naphthalene, 5-(N-methyl-N-phenyl)-amino-1-naphthol, 5-acetamido-1-naphthol, 5-acetamio-2-naphthol, 4-acetamido-1-naphthol, 8-acetamido-2-naphthol, 5-acetamido-1-methoxy-naphthalene, 5-propionamido-2-naphthol, 6-propionamido-1-naphthol, 7-propionamido-1-ethoxy-naphthalene, 8-butylamido-2-naphthol, 5 -acrylamido-1-naphthol, 5-cinnamamido-1-naphthol, 5-(4'-chloro)-cinnamamido-2-naphthol, 5-benzamido-2-naphthol, 4-benzamido-1-naphthol, 5-benzamido-1-naphthol, 5-benzamido-2-naphthol, 8-benzamido-2-naphthol, 7-benzamido-1-methoxy-naphthalene, 5-(4'-methyl)-benzamido-1-naphthol, 5-(4'-methyl)-benzamido-2-naphthol, 4-(2'-methyl-benzamido-1-naphthol, 8-(3'-methyl)-benzamido-1-methoxy-naphthalene, 5-(4'-ethyl)-benzamido-1-methoxy-naphthalene, 5-(2',4'-dimethyl)-benzamido-2-naphthol, 5-(4'-methoxy)-benzamido-1-naphthol, 5-(2'-methoxy)-benzamido-2-naphthol, 4-(2'-ethoxy)-benzamido-1-naphthol, 8-(2'-ethoxy)-benzamido-2-naphthol, 5-(4'-chloro)-benzamido-1-naphthol, 5-(4'-chloro)-benzamido-2-naphthol, 4-(4'-bromo)-benzamido-1-naphthol, 8-(2'-chloro)-benzamido-2-naphthol, 5-(2',4'-dichloro)-benzamido-2-naphthol, 5-(3'-chloro-4'-methyl)-benzamido-1-naphthol, 5-(4'-dimethylamino)-benzamido-1-methoxy-naphthalene, 5-(4'-nitro)-benzamido-2-naphthol, 4-(2',4'-dinitro)-benzamido-1-methoxy-naphthalene, 5-(4'-oxy)-benzamido-2-naphthol, 7-(2',4'-dioxy)-benzamido-1-naphthol, 5-(3'-methoxy-4'-oxy)-benzamido-1-naphthol, 5-(1'-naphthoyl)-amino-1-naphthol, 5-(2'-naphthoyl)-amino-2-naphthol, 5-(5'-methyl-1'-naphthoyl)-amino-1-naphthol and the like.

The benzoyl-pyridine-carboxylic acids represented by the formula (IIa) or (IIb) above can be prepared by one of the following procedures (1) to (4):

1. quinolinic anhydride is reacted with an aniline compound corresponding to the desired benzoyl-pyridine-carboxylic acid represented by the formula (IIa) or (IIb) in a volatile inert organic solvent such as carbon disulfide, carbon tetrachloride, tetrachloroethane, benzene, chlorobenzene, nitrobenzene or the like using a Friedel-Crafts catalyst such as zinc chloride, phosphorus chloride, aluminum chloride or the like at a temperature of from 10° to 110°C for a period of from about 1 to 9 hours.

2. quinolinic anhydride is reacted with an aniline compound corresponding to the desired benzoyl-pyridine-carboxylic acid represented by the formula (IIa) or (IIb) in a condensing agent such as concentrated sulfuric acid, phosphoric acid, polyphosphoric acid or the like at a temperature of from about 30° to 120°C for a period of from 2 to 8 hours.

3. quinolinic anhydride is reacted with an aniline compound corresponding to the desired benzoyl-pyridine-carboxylic acid represented by the formula (IIa) or (IIb), optionally in an inert organic solvent as those described above (1) at a temperature of from 100° to 180°C for a period of from 2 to 10 hours.

4. quinolinic acid is reacted with sulfuryl chloride, phosphorus pentachloride or the like to produce quinolinic acid chloride which is then reacted with an aniline compound corresponding to the desired benzoyl-pyridine-carboxylic acid represented by the formula (IIa) or (IIb) in the organic insert solvent as those described above using a Friedel-Crafts catalyst.

Of these alternative procedures, a particularly preferred procedure is that described in (1) above and this procedure is illustrated hereinbelow in greater detail.

1 mole of quinolinic anhydride, 0.9 to 2.0 moles, preferably 1.0 to 1.5 moles of an aniline compound corresponding to the benzoyl-pyridine-carboxylic acid represented by the formula (IIa) or (IIb) and 1.0 to 3.0 moles, preferably 1.0 to 1.5 moles of a Friedel-Crafts catalyst are added to 0.5 to 2.5 liter of the above described volatile organic inert solvent, and the resulting mixture is allowed to react at a temperature of from about 10° to 110°C for a period of from about 1 to 9 hours. The resulting reaction mixture is then cooled to room temperature, and a crystalline isomer mixture comprising a 3-benzoyl-pyridine-carboxylic acid-(2) and a 2-benzoyl-pyridine-carboxylic acid-(3) represented by the formulae (IIa) and (IIb) can be recovered from the reaction mixture by either the following (1) or (2):

1. The reaction product obtained by removing the solvent by decantation is added to about 2 to 6 liter of ice-water or a cold dilute aqueous hydrochloric acid to decompose any remaining catalyst used. The precipitated solid is then filtered, washed successively with water and an alcohol or benzene and dried.

2. The reaction product obtained as above (1) is added to about 2 to 6 liter of ice-water to decompose any remaining catalyst used, and an additional portion of the organic inert solvent as described above is added to the aqueous mixture to transfer the reaction product into the organic solvent layer. The organic solvent layer is then separated and the solvent is distilled off to leave the reaction product as a residue.

Also, if desired, the above isomer mixture can be separated into each of the isomers, i.e., a 3-benzoyl-pyridine-carboxylic acid-(2) or 2-benzoyl-pyridine-carboxylic acid-(3) as highly purified crystals by (1) dissolving the isomer mixture in aqueous sodium hydroxide, adding dilute aqueous hydrochloric acid to the resulting solution in small portions and separately recovering the solid which precipitates due to the difference in pH of the solution, (2) repeatedly recrystallizing the isomer mixture from a solvent mixture of a less polar solvent such as benzene, toluene and the like and a polar solvent such as methanol, butanol and the like, or (3) a combination of (1) and (2) above.

The pyridine-carboxylic acid lactones of this invention represented by the formula (Ia) or (Ib) above can be prepared as follows. In the preparation of these pyridine-carboxylic acid lactones, the benzoyl-pyridine-carboxylic acids used herein represented by the formula (IIa) or (IIb) are those prepared as described above and two isomers in the resulting benzoyl-pyridine-carboxylic acids may be present therein in any proportion. That is, benzoyl-pyridine-carboxylic acids which can be used in the preparation of the pyridine-carboxylic acid lactones include a highly purified 2-benzoyl-pyridine-carboxylic acid-(3) or a highly purified 3-benzoyl-pyridine-carboxylic acid-(2), an isomer mixture comprising predominantly a 3-benzoyl-pyridine-carboxylic acid-(2) and a small amount of a 2-benzoyl-pyridine-carboyxlic acid-(3) or vice versa or any other isomer mixtures in which a 3-benzoyl-pyridine-carboxylic acid-(2) and a 2-benzoyl-pyridine-carboxylic acid-(3) are present in optional proportions.

The pyridine-carboxylic acid lactones can be prepared by reacting a benzoyl-pyridine-carboxylic acid represented by the formula (IIa) or (IIb) above with a naphthalene compound represented by the formula (III) in the presence of a condensing agent. If desired, a volatile inert organic solvent such as chloroform, tetrachloroethane, benzene, chlorobenzenes or the like can be employed as a solvent in order to ensure smooth proceeding of the condensation reaction. The condensing agent which can be used includes concentrated sulfuric acid, acetic anhydride, phosphorus pentachloride, phosphorus oxychloride, phosphoric acid, polyphosphoric acid, zinc chloride, stannic chloride, aluminum chloride or the like. Of these condensing agents, concentrated sulfuric acid or polyphosphoric acid is preferably employed because it serves not only as a condensing agent but also as a reaction solvent. The process for preparing these lactones according to the present invention is illustrated below in greater detail.

One mole of the benzoyl-pyridine-carboxylic acid represented by the formula (IIa) or (IIb) and 1.0 to 1.5 moles, preferably 1.0 to 1.2 moles, of the naphthalene compound represented by the formula (III) are added to about 3 to 30 moles of concentrated sulfuric acid or polyphosphoric acid, and the resulting mixture is allowed to react at a temperature of about 30° to 130°C for a period of from about 2 to 10 hours. The reaction product is then poured into about 1 to 5 liters of ice-water to hydrolyze or dilute the condensing agent, and the resulting aqueous solution is made weakly acidic or neutral with dilute aqueous sodium hydroxide. Benzene or toluene is added thereto followed by stirring to transfer any unreacted naphthalene compound to the benzene or toluene layer, which is then removed by separation. The residual aqueous layer is adjusted to a pH ranging from about 11 to 12 with dilute aqueous sodium hydroxide and the precipitated solid is filtered, washed successively with water and a small amount of petroleum ether or an alcohol and dried to obtain a lactone compound of the pyridine-carboxylic acid represented by the formula (Ia) or (Ib) as substantially colorless or slightly colored crystals in high yield. Alternatively, the residual aqueous layer as above obtained after removal of the benzene or toluene layer is adjusted to a pH of 11 to 12 with dilute aqueous sodium hydroxide, and benzene or toluene is added to the resulting aqueous solution followed by stirring to transfer the lactone compound of pyridine-carboxylic acid to the benzene or toluene layer which is then recovered by separation. The benzene or toluene is distilled off from the benzene or toluene layer to obtain a residue which is then washed successively with water and a small amount of an alcohol or benzene and dried to obtain a lactone compound of pyridine-carboxylic acid represented by the formula (Ia) or (Ib) as substantially colorless or slightly colored crystals in high yield. If desired, the above obtained lactone compound of pyridine-carboxylic acid can be recrystallized from an appropriate solvent.

Representative compounds of the present invention represented by the formula (Va) or (Vb) are 3- and 2-[3'-dimethylamino-7'-amino-benzo(c)-11'-oxy-xanthenyl]-pyridine-carboxylic acid-(2) and -(3) lactone; 3- and 2-[3'-diethylamino-7'-amino-benzo(c)-11'-oxy-xanthenyl]-pyridine-carboxylic acid-(2) and -(3) lactone; 3- and 2-[3'-diethylamino-10'-amino-benzo(c)-11'-oxy-xanthenyl]-pyridine-carboxylic acid-(2) and -(3) lactone; 3- and 2-[3'-ethylamino-8'-amino-benzo(a)-11'-oxy-xanthenyl]-pyridine-carboxylic acid-(2) and -(3) lactone; 3- and 2-[3'-diethylamino-8'-amino-benzo(a)-11'-xanthenyl]-pyridine-carboxylic acid-(2) and -(3) lactone; 3- and 2-[3'-diethylamino-9'-amino-benzo(a)-11'-oxy-xanthenyl]-pyridine-carboxylic acid-(2) and -(3) lactone; 3- and 2-[3'-dibenzylamino-7'-amino-benzo(c)-11'-oxy-xanthenyl]-pyridine-carboxylic acid-(2) and -(3) lactone; 3- and 2-[3'-dibenzylamino-8'-amino-benzo(a)-11'-oxy-xanthenyl]-pyridine-carboxylic acid-(2) and -(3) lactone; 3- and 2-[3' -anilino-7'-amino-benzo(c)-11'-oxy-xanthenyl]-pyridine-carboxylic acid-(2) and -(3) lactone; 3- and 2-[3'-(N-methyl-N-phenyl)-amino-7'-amino-benzo(c)-11'-oxy-xanthenyl]-pyridine-carboxylic acid-(2) and -(3) lactone; 3- and 2-[3'-(N-methyl-N-phenylamino-8'-amino-benzo(a)-11'-oxy-xanthenyl]-pyridine-carboxylic acid-(2) and -(3) lactone; 3- and 2-[(3'-(N-ethyl-N-phenyl)-amino-9'-amino-benzo(a)-11'-oxy-xanthenyl]-pyridine-carboxylic acid-(2) and -(3) lactone; 3- and 2-[3'-N-methyl-N-(4''-methyl)-phenylamino-8'-amino-benzo(a)-11'-oxy-xanthenyl]-pyridine-carboxylic acid-(2) and -(3) lactone; 3- and 2-[3'-N-methyl-N-(4''-chloro)-phenyl-amino-7'-amino-benzo(c)-11'-oxy-xanthenyl]-pyridine-carboxylic acid-(2) and -(3) lactone; 3- and 2-[3'-diethylamino-7'-amino-benzo(c)-11'-oxy-xanthenyl]-4-methyl-pyridine-carboxylic acid-(2) and -(3) lactone; 3- and 2-[3'-diethylamino-7'-aminobenzo(c)-11'-oxy-xanthenyl]-4-chloro-pyridine-carboxylic acid-(2) and -(3) lactone; 3- and 2-[3'-diethylamino-8'-amino-benzo(a)-11'-oxy-xanthenyl]-4-chloro-pyridine-carboxylic acid-(2) and -(3) lactone, 3- and 2-[3'-diethylamino-7'-amino-benzo(c)-11'-oxy-xanthenyl]-6-phenyl-pyridine-carboxylic acid-(2) and -(3) lactone and the like.

Representative compounds of the acid halide represented by the formula (VII) are acetyl chloride, propionyl chloride, butyryl chloride, acryloyl chloride, benzoyl chloride, 2-toluoyl chloride, 4-toluoyl chloride, 2,4-dimethyl-benzoyl chloride, 2-methoxy-benzoyl chloride, 2,4-diethoxy-benzoyl chloride, 3-dimethylamino-benzoyl chloride, 4-diethylamino-benzoyl chloride, 4-oxy-benzoyl bromide, 3,4,5-trioxy-benzoyl chloride, 4-nitro-benzoyl chloride, 2-chlorobenzoyl chloride, 4-bromo-benzoyl bromide, 2,4-dichloro-benzoyl chloride, 2-methyl-5-chloro-benzoyl chloride, cinnamoyl chloride, 4-chloro-cinnamoyl chloride, 4-dimethylamino-cinnamoyl chloride, 1-naphthoyl chloride, 2-naphthoyl chloride, 1-oxy-2-naphthoyl chloride and the like.

The pyridine-carboxylic acid lactone compounds represented by the formula (VIIIa) or (VIIIb) can be prepared by reacting a pyridine-carboxylic acid lactone represented by the formula (Va) or (Vb) with an acid halide represented by the formula (VIII) in a volatile inert organic solvent such as chloroform, benzene, toluene, chlorobenzenes or the like in the presence of an acid acceptor, for example, volatile organic basic compounds such as triethylamine, pyridine, dimethylaniline or the like or water-soluble inorganic basic compounds such as sodium bicarbonate, sodium carbonate or the like, preferably in the presence of a volatile organic like basic compound. In a preferred embodiment, 1.0 mole of a pyridine-carboxylic acid lactone represented by the formula (Va) or (Vb) is dissolved in a mixture of about 0.3 to 1.0 liter of the above volatile inert organic solvent and 1.0 to 1.5 moles of the above volatile organic basic compound, and 1.0 to 1.5 moles of an acid halide represented by the formula (VII) is added to the resulting solution. After allowing the resulting mixture to react for 2 to 8 hours at a temperature of from 40° to 110°C, the reaction mixture is allowed to cool to room temperature and washed with water. The volatile inert organic solvent is then distilled off and the resulting residue is washed with a small amount of an alcohol, petroleum ether or ligroin and dried to obtain a lactone compound of the pyridine-carboxylic acid represented by the formula (VIIIa) or (VIIIb) in high yield as substantially colorless or slightly colored crystals. If desired, the thus obtained pyridine-carboxylic acid lactone can be purified by recrystallization.

The present invention is further illustrated in greater detail by the following Examples, but these Examples are not to be construed as limiting the scope of this invention. All parts, percentages, proportions and the like are by weight unless otherwise indicated.

EXAMPLE 1

10 g of quinolinic anhydride and 26 g of N,N-diethyl-m-phenetidine were added to 100 ml of benzene, and 27 g of anhydrous aluminum chloride was added to the mixture in small portions over about 20 minutes while stirring and maintaining the temperature at 30° to 35°C.

Upon completion of the addition, the mixture was allowed to react for 4 hours at a temperature in the range of from 35° to 38°C and thereafter was cooled to room temperature. The benzene was removed by decantation, and the resulting reaction product was added to 300 ml of ice-water followed by stirring. The precipitated solid was filtered, washed with water and dried to give 15.5 g of an isomer mixture comprising 3-[2'-ethoxy-4'-diethylamino-benzoyl]-pyridine-carboxylic acid-(2) and 2-[2'-ethoxy-4'-diethylamino-benzoyl]- pyridine-carboxylic acid-(3) as pale brown crystals having a melting point of 245° to 253°C. 15.5 g of the resulting crystals was then dissolved in dilute aqueous sodium hydroxide. Dilute aqueous hydrochloric acid was added to the solution to adjust the pH to 6 and the precipitated solid was filtered (the filtrate was set aside), washed and dried to give 10 g of an isomer mixture comprising predominantly 3-[2'-ethoxy-4'-diethylamino-benzoyl]-pyridine-carboxylic acid-(2) and a small amount of 2-[2'-ethoxy-4'-diethylamino-benzoyl]-pyridine-carboxylic acid-(3) as light yellowish brown crystals having a melting point of 293° to 297°C. 10 g of the resulting crystals was then recrystallized several times from a mixed solvent of methanol-benzene (1 : 1 by volume) to give 6.5 g of a highly purified 3-[2'-ethoxy-4'-diethylamino-benzoyl]-pyridine-carboxylic acid-(2) as pale yellow crystals having a melting point of 297° to 298°C.

The filtrate having a pH of 6 obtained from the filtration of the above product was then adjusted to a pH of about 2 with dilute aqueous hydrochloric acid, and the precipitated solid was filtered, washed with water and dried to give 4 g of an isomer mixture comprising predominantly 2-[2'-ethoxy-4'-diethylamino-benzoyl]-pyridine-carboxylic acid-(3) and a small amount of 3-[2'-ethoxy-4'-diethylamino-benzoyl]-pyridine-carboxylic acid-(2) as pale brown crystals having a melting point of 176° to 181°C.

4 g of the isomer mixture thus obtained was then recrystallized several times from a mixed solvent of methanol-toluene (1 : 1 by volume) to give 2.3 g of a highly purified 2-[2'-ethoxy-4'-diethylamino-benzoyl]-pyridine-carboxylic acid-(3) as substantially colorless crystals having a melting point of 179° to 180°C.

2 g of the above obtained 3-[2'-ethoxy-4'-diethylamino-benzoyl]-pyridine-carboxylic acid-(2) (m.p., 297° - 298°C) and 1.2 g of 5-dimethylamino-2-naphthol were added to 18.4 g of 95% sulfuric acid, and the mixture was allowed to react at a temperature of 95° to 100°C for 4 hours followed by allowing the mixture to cool to room temperature. The reaction product was then poured into 100 ml of ice-water, and the mixture was adjusted to a pH of about 11 with dilute aqueous sodium hydroxide. 50 ml of benzene was then added to the resulting aqueous solution to transfer the resulting lactone of pyridine-carboxylic acid to the benzene layer which was then recovered by separation. The benzene was distilled off from the benzene layer, and the residue thus obtained was washed successively with water and a small amount of petroleum ether and dried to give 2.3 g of 3-[3'-diethylamino-7'-dimethylamino-benzo(c)-11'-oxy-xanthenyl]-pyridine-carboxylic acid-(2) lactone as pale white-brown colored crystals having a melting point of 217° to 219°C. A solution of the above crystals in benzene showed a purplish blue color immediately after the solution was adsorbed on acid clay. Also, a suspension of the above crystals in polyvinyl acetate developed a purplish blue color immediately after the suspension was heated at a temperature of from 120° to 150°C.

2.0 g of 2-[2'-ethoxy-4'-diethylamino-benzoyl]-pyridine-carboxylic acid-(3) (m.p., 179° - 180°C) obtained above and 1.2 g of 5-dimethylamino-2-naphthol were added to 18.4 g of 95% sulfuric acid, and the mixture was allowed to react at a temperature of from 95° to 100°C for 4 hours followed by cooling to room temperature. The reaction product was poured into 100 ml of ice-water and the mixture was adjusted to a pH of about 11 with dilute aqueous sodium hydroxide while stirring, and 50 ml of benzene was added to the mixture to transfer the resulting lactone of pyridine-carboxylic acid to the benzene layer which was then recovered by separation. The benzene was distilled off from the benzene layer, and the residue thus obtained was washed successively with water and a small amount of petroleum ether and dried to give 2.2 g of 2-[3'-diethylamino-7'-dimethylamino-benzo(c)-11'-oxy-xanthenyl]-pyridine-carboxylic acid-(3) lactone as slightly white brown colored crystals having a melting point of 174° to 176°C. A solution of the above crystals in benzene developed a purplish blue color immediately after the solution was adsorbed on acid clay.

EXAMPLE 2

4.0 g of the isomer mixture of benzoyl-pyridine-carboxylic acid having a melting point of 245° to 253°C as described in Example 1 and 2.0 g of 2-naphthol were added to 40 g of 98% sulfuric acid, and the mixture was allowed to react at a temperature of from 95° to 100°C for 4 hours followed by cooling to room temperature. The reaction product was poured into 200 ml of ice-water, and the mixture was adjusted to a pH of about 11 with dilute aqueous sodium hydroxide. To the mixture was added 100 ml of toluene to transfer the resulting lactone of pyridine-carboxylic acid to the toluene layer, and the toluene layer was recovered by separation. The toluene was distilled off from the toluene layer and the residue thus obtained was washed successively with water and a small amount of petroleum ether and dried to give 2.8 g of a mixture comprising 3-[3'diethylamino-benzo(c)-11'-oxy-xanthenyl]-pyridine-carboxylic acid-(2) lactone and 2-[3'-diethylamino-benzo(c)-11'-oxy-xanthenyl]-pyridine-carboxylic acid-(3) lactone as slightly pale purplish brown colored crystals having a melting point of 155° to 159°C. A solution of the above crystals in toluene developed a reddish purple color immediately after the solution was adsorbed on acid clay.

EXAMPLE 3

2.0 g of the isomer mixture of benzoyl-pyridine-carboxylic acid having a melting point of 245° - 253°C as described in Example 1 and each of naphthalenes (19 compounds listed in Table 1 below) in an amount indicated in the table were added to 20 g of 95% sulfuric acid, and the mixture was allowed to react at a temperature of from 95° to 100°C for 4 hours. After completion of the reaction, the reaction product in each instance was worked up in the same manner as described in Example 2 to give the following lactones. (The sample number of the resulting lactone is shown in parentheses)

(No. 3-a)

A mixture comprising 3-[3'-diethylamino-8'-bromo-benzo(c)-11'-oxy-xanthenyl]-pyridine-carboxylic acid-(2) lactone and 2-[3'-diethylamino-8'-bromo-benzo(c)-11'-oxy-xanthenyl]-pyridine-carboxylic acid-(3) lactone.

(No. 3-b)

A mixture comprising 3-[3'-diethylamino-8'-methoxy-benzo(c)-11'-oxy-xanthenyl]-pyridine-carboxylic acid-(2) lactone and 2-[3'-diethylamino-8'-methoxy-benzo(c)-11'-oxy-xanthenyl]-pyridine-carboxylic acid-(3) lactone.

(No. 3-c)

A mixture comprising 3-[3'-diethylamino-8'-n-butyl-benzo(c)-11'-oxy-xanthenyl]-pyridine-carboxylic acid-(2) lactone and 2-[3'-diethylamino-8'-n-butyl-benzo(c)-11'-oxy-xanthenyl]-pyridine-carboxylic acid-(3) lactone.

(No. 3-d)

A mixture comprising 3-[3'-diethylamino-7'-amino-benzo(c)-11'-oxy-xanthenyl]-pyridine-carboxylic acid-(2) lactone and 2-[3'-diethylamino-7'-amino-benzo(c)-11'-oxy-xanthenyl]-pyridine-carboxylic acid-(3) lactone.

(No. 3-e)

A mixture comprising 3-[3'-diethylamino-10'-amino-benzo(c)-11'-oxy-xanthenyl]-pyridine-carboxylic acid-(2) lactone and 2-[3'-diethylamino-10'-amino-benzo(c)-11'-oxy-xanthenyl]-pyridine-carboxylic acid-(3) lactone.

(No. 3-f)

A mixture comprising 3-[3',7'-tetraethyldiamino-benzo(c)-11'-oxy-xanthenyl]-pyridine-carboxylic acid-(2) lactone and 2-[3',7'-tetraethyldiamino-benzo(c)-11'-oxy-xanthenyl]-pyridine-carboxylic acid-(3) lactone.

(No. 3-g)

A mixture comprising 3-[3'-diethylamino-7'-dibenzylamino-benzo(c)-11'-oxy-xanthenyl]-pyridine-carboxylic acid-(2) lactone and 2-[3'-diethylamino-7'-dibenzylamino-benzo(c)-11'-oxy-xanthenyl]-pyridine-carboxylic acid-(3) lactone.

(No. 3-h)

A mixture comprising 3-[3'-diethylamino-7'-ethylamino-benzo(c)-11'-oxy-xanthenyl]-pyridine-carboxylic acid-(2) lactone and 2-[3'-diethylamino-7'-ethylamino-benzo(c)-11'-oxy-xanthenyl]-pyridine-carboxylic acid-(3) lactone.

(No. 3-i)

A mixture comprising 3-[3'-diethylamino-7'-anilino-benzo(c)-11'-oxy-xanthenyl]-pyridine-carboxylic acid-(2) lactone and 2-[3'-diethylamino-7'-anilino-benzo(c)-11'-oxy-xanthenyl]-pyridine-carboxylic acid-(3) lactone.

(No. 3-j)

A mixture comprising 3-[3',10'-tetraethyldiamino-benzo(c)-11'-oxy-xanthenyl]-pyridine-carboxylic acid-(2) lactone and 2-[3',10'-tetraethyldiamino-benzo(c)-11'-oxy-xanthenyl]-pyridine-carboxylic acid-(3) lactone.

(No. 3-k)

A mixture comprising 3-[3'-diethylamino-10'-anilino-benzo(c)-11'-oxy-xanthenyl]-pyridine-carboxylic acid-(2) lactone and 2-[3'-diethylamino-10'-anilino-benzo(c)-11'-oxy-xanthenyl]-pyridine-carboxylic acid-(3) lactone.

(No. 3-l)

A mixture comprising 3-[3'-diethylamino-benzo(a)-11'-oxy-xanthenyl]-pyridine-carboxylic acid-(2) lactone and 2-[3'-diethylamino-benzo(a)-11'-oxy-xanthenyl]-pyridine-carboxylic acid-(3) lactone.

(No. 3-m)

A mixture comprising 3-[3'-diethylamino-9'-ethoxy-benzo(a)-11'-oxy-xanthenyl]-pyridine-carboxylic acid-(2) lactone and 2-[3'-diethylamino-9'-ethoxy-benzo(a)-11'-oxy-xanthenyl]-pyridine-carboxylic acid-(3) lactone.

(No. 3-n)

A mixture comprising 3-[3'-diethylamino-8'-amino-benzo(a)-11'-oxy-xanthenyl]-pyridine-carboxylic acid-(2) lactone and 2-[3'-diethylamino-8'-amino-benzo(a)-11'-oxy-xanthenyl]-pyridine-carboxylic acid-(3) lactone.

(No. 3-o)

A mixture comprising 3-[3'-diethylamino-8'-dimethyl-amino-benzo(a)-11'-oxy-xanthenyl]-pyridine-carboxylic acid-(2) lactone and 2-[3'-diethylamino-8'-dimethylamino-benzo(a)-11'-oxy-xanthenyl]-pyridine-carboxylic acid-(3) lactone.

(No. 3-p)

A mixture comprising 3-[3'-diethylamino-8'-anilino-benzo(a)-11'-oxy-xanthenyl]-pyridine-carboxylic acid-(2) lactone and 2-[3'-diethylamino-8'-anilino-benzo(a)-11'-oxy-xanthenyl]-pyridine-carboxylic acid-(3) lactone.

(No. 3-q)

A mixture comprising 3-[3'-diethylamino-9'-benzylamino-benzo(a)-11'-oxy-xanthenyl]-pyridine-carboxylic acid-(2) lactone and 2-[3'-diethylamino-9'-benzylamino-benzo(a)-11'-oxy-xanthenyl]-pyridine-carboxylic acid-(3) lactone.

(No. 3r)

A mixture comprising 3-[3'-diethylamino-9'-dimethylamino-benzo(a)-11'-oxy-xanthenyl]-pyridine-carboxylic acid-(2) lactone and 2-[3'-diethylamino-9'-dimethylamino-benzo(a)-11'-oxy-xanthenyl]-pyridine-carboxylic acid-(3) lactone.

(No. 3s)

A mixture comprising 3-[3'-diethylamino-9'-(N-methyl-N-phenyl)-amino-benzo(a)-11'-xanthenyl]-pyridine-carboxylic acid-(2) lactone and 2-[3'-diethylamino-9'-(N-methyl-N-phenyl)-amino-benzo(a)-11'-xanthenyl]-pyridine-carboxylic acid-(3) lactone.

Table 1

| Sample No. | Naphthalene Compound | Amount (g) | Yield (g) | Melting Point (°C) | Color or Crystals | Color Developed |
|---|---|---|---|---|---|---|
| No.3-a | 6-Bromo-2-naphthol | 1.5 | 2.1 | 139–143 | pale pink | red |
| No.3-b | 6-Methoxy-2-naphthol | 1.4 | 2.0 | 172–175 | pale pink | red |
| No.3-c | 6-n-Butyl-2-naphthol | 1.2 | 1.8 | 181–188 | pale pink | red |
| No.3-d | 5-Amino-2-naphthol | 1.5 | 2.0 | 239–242 | pale green | purplish blue |
| No.3-e | 8-Amino-2-naphthol | 1.5 | 1.3 | 195–203 | pale purple | reddish purple |
| NO.3-f | 5-Diethylamino-2-naphthol | 1.4 | 2.2 | 172–177 | pale blue | purplish blue |
| NO.3-g | 5-Dibenzylamino-2-naphthol | 2.4 | 2.5 | 198–204 | pale brown | purplish blue |
| No.3-h | 5-Ethylamino-2-naphthol | 1.3 | 1.7 | 153–160 | pale purple | purplish blue |
| No.3-i | 5-Anilino-2-naphthol | 1.7 | 1.9 | — | pale purple | purplish blue |
| No.3-j | 8-Diethylamino-2-naphthol | 1.4 | 1.2 | 184–191 | pale brown | reddish purple |
| No.3-k | 8-Anilino-2-naphthol | 1.7 | 1.4 | — | pale brown | reddish purple |
| No.3-l | 1-Naphthol | 1.0 | 2.0 | 226–230 | pale pink | reddish purple |
| No.3-m | 4-Ethoxy-1-naphthol | 1.5 | 1.3 | 214–219 | pale brown | red |

Table 1—Continued

| Sample No. | Naphthalene Compound | Amount (g) | Yield (g) | Melting Point (°C) | Color or Crystals | Color Developed |
|---|---|---|---|---|---|---|
| No.3-n | 5-Amino-1-naphthol | 1.5 | 1.5 | 237–243 | pale yellow | dark reddish brown |
| No.3-o | 5-Dimethylamino-1-naphthol | 1.3 | 1.9 | 186–192 | pale brown | dark reddish brown |
| No.3-p | 5-Anilino-1-naphthol | 1.7 | 2.0 | 173–178 | pale brown | dark reddish brown |
| No.3-q | 4-Benzylamino-1-naphthol | 1.8 | 1.6 | — | pale yellowish green | dark green |
| No.3-r | 4-Dimethylamino-1-naphthol | 1.3 | 1.8 | 162–169 | pale pink | green |
| No.3-s | 4-(N-Methyl-N-phenyl)-amino-1-naphthol | 1.8 | 1.3 | 154–161 | pale green | dark green |

EXAMPLE 4

7.0 g of quinolinic anhydride and 14.0 g of N-methyl-N-phenyl-m-anisidine were added to 80 ml of benzene, and 18.8 g of anhydrous aluminum chloride was added to the mixture over 20 minutes at a temperature of from 20° to 34°C while stirring. After completion of the addition, the mixture was allowed to react at a temperature of from 45° to 50°C for 4 hours followed by cooling to room temperature, and the benzene was removed by decantation. The precipitated solid was then filtered, washed with water and dried to give 13.6 g of an isomer mixture comprising 3-[2'-methoxy-4'-(N-methyl-N-phenyl)-amino-benzoyl]-pyridine-carboxylic acid-(2) and 2-[2'-methoxy-4'-(N-methyl-N-phenyl)-amino-benzoyl]-pyridine-carboxylic acid-(3) as pale brown colored crystals having a melting point of 205° to 217°C. The crystals were recrystallized, if necessary.

3.6 of the above isomer mixture of benzoyl-pyridine-carboxylic acids (m.p., 205°–217°C) and 2.4 g of 5-dimethylamino-2-naphthol were added to 17 g of 95% sulfuric acid, and the mixture was allowed to react at a temperature of from 95° to 100°C for 4 hours followed by allowing the mixture to cool to room temperature. The reaction product was then poured into 200 ml of ice-water, and the mixture was adjusted to a pH of about 12 with dilute aqueous sodium hydroxide while stirring. 100 ml of benzene was added to the mixture to transfer the resulting lactone of pyridine-carboxylic acid, and the benzene was recovered by separation. The benzene was then distilled off from the benzene layer and the residue thus obtained was washed successively with water and a small amount of petroleum ether and dried to give 2.3 g of an isomer mixture comprising 3-[3'-(N-methyl-N-phenyl)-amino-7'-dimethylamino-benzo(c)-11'-oxy-xanthenyl]-pyridine-carboxylic acid-(2) lactone and 2-[3'-(N-methyl-N-phenyl)-amino7'-dimethylamino-benzo(c)-11'-oxy-xanthenyl]-pyridine-carboxylic acid-(3) lactone as plae purple colored crystals having a melting point of 183° to 190°C. A solution of the above crystals in benzene developed a reddish purple color immediately after the solution was adsorbed on acid clay.

EXAMPLE 5

5.0 g of quinolinic anhydride and 14.2 g of N,N-dibenzyl-m-anisidine were added to 60 ml of benzene, and 15.3 g of anhydrous aluminum chloride was added to the mixture over 20 minutes at a temperature of from 20° to 35°C while stirring. After completion of the addition, the mixture was allowed to react at a temperature of from 45° to 50°C for 5 hours. After the reaction was completed, the reaction mixture was worked up in the same manner as described in Example 4 to give 10.8 g of an isomer mixture comprising 3-[2'-methoxy-4'-dibenzylamino-benzoyl]-pyridine-carboxylic acid-(2) and 2-[2'-methoxy-4'-dibenzylaminobenzoyl]-pyridine-carboxylic acid-(3) as pale brown colored crystals having a melting point of from 195° to 203°C. The crystals were recrystallized, if necessary.

4.5 g of the above isomer mixture of benzoyl-pyridine-carboxylic acids (m.p., 195°–203°C) and 1.8 g of 2-naphthol were added to 25 g of 90% sulfuric acid, and the mixture was allowed to react at a temperature of from 110° to 120°C for 6 hours followed by working up in the same manner as described in Example 4 to give 4.8 g of an isomer mixture comprising 3-[3'-dibenzylamino-benzo(c)-11'-oxy-xanthenyl]-pyridine-carboxylic acid-(2) lactone and 2-[3'-dibenzylamino-benzo(c)-11'-oxy-xanthenyl]-pyridine-carboxylic acid-(3) having a melting point of 167° to 172°C. A solution of the above crystals in toluene developed a red color immediately after the solution was adsorbed on acid clay.

EXAMPLE 6

4.5 g of the isomer mixture of benzoyl-pyridine-carboxylic acid having a melting point of 195° – 203°C as described in Example 5 and each of the naphthalenes listed in Table 2 below in an amount indicated in the table were added to 25 g of 95% sulfuric acid, and the mixture was allowed to react at a temperature of from 95° to 100°C for 4 hours. After completion of the reaction, the reaction product in each instance was worked up in the same manner as described in Example 4 to give the following lactones. (The sample number of the resulting lactone is shown in parentheses)

(No. 6-a)

A mixture comprising 3-[3'-dibenzylamino-benzo(a)-11'-oxy-xanthenyl]-pyridine-carboxylic acid-(2) lactone and 2-[3'-dibenzylamino-benzo(a)-11'-oxy-xanthenyl]-pyridine-carboxylic acid-(3) lactone.

(No. 6-b)

A mixture comprising 3-[3'-dibenzylamino-7'-dimethylamino-benzo(c)-11'-oxy-xanthenyl]-pyridine-carboxylic acid-(2) lactone and 2-[3'-dibenzylamino-7'-dimethylamino-benzo(c)-11'-oxy-xanthenyl]-pyridine-carboxylic acid-(3) lactone.

(No. 6-c)

A mixture comprising 3-[3'-dibenzylamino-8'-dimethylamino-benzo(a)-11'-oxy-xanthenyl]-pyridine-carboxylic acid-(2) lactone and 2-[3'-dibenzylamino-8'-dimethylamino-benzo(a)-11'-oxy-xanthenyl]-pyridine-carboxylic acid-(3) lactone.

(No. 6-d)

A mixture comprising 3-[3'-dibenzylamino-8'-(N- methyl-N-benzyl)-amino-benzo(a)-11'-oxy-xanthenyl]-pyridine-carboxylic acid-(2) lactone and 2-[3'-dibenzylamino-8'-(N-methyl-N-benzyl)-amino-benzo(a)-11'-oxy-xanthenyl]-pyridine-carboxylic acid-(3) lactone.

Table 2

| Sample No. | Naphthalene Compound Used and Amount | Yield | Melting Point | Color of Crystals | Color Developed |
|---|---|---|---|---|---|
| | | (g) | (g) | (°C) | | |
| No.6-a | 1-Naphthol | 1.8 | 3.5 | 230–238 | pale pink | red |
| No.6-b | 5-Dimethylamino-2-naphthol | 1.9 | 4.2 | 174–179 | pale purple | purplish blue |
| No.6-c | 5-Dimethylamino-1-naphthol | 1.9 | 4.4 | 193–201 | pale brown | dark reddish brown |
| No.6-d | 5-(N-Methyl-N-benzyl)-amino-1-napthol | 2.4 | 3.2 | — | pale brown | dark reddish brown |

EXAMPLE 7

In the same manner as described in Example 4, quinolinic anhydride was reacted with 3-(4'-chloro)-anilino-phenol, 3-(4'-methyl)-anilino-phenol or 3-benzylamino-phenol in place of N-methyl-N-phenyl-m-anisidine to obtain the corresponding pyridine-carboxylic acid, i.e., an isomer mixture comprising 3-[2'-oxy-4'-(4''-chloro)-anilino-benzoyl]-pyridine-carboxylic acid-(2) and 2-[2'-oxy-4'-(4''-chloro)-anilino-benzoyl]-pyridine-carboxylic acid-(3), an isomer mixture comprising 3-[(2'-oxy-4'-(4''-methyl)-anilino-benzoyl]-pyridine-carboxylic acid-(2) and 2-[2'-oxy-4'-(4''-methyl)-anilino-benzoyl]-pyridine-carboxylic acid-(3) or an isomer mixture comprising 3-(2'-oxy-4'-benzylamino-benzoyl)-pyridine-carboxylic acid-(2) and 2-(2'-oxy-4'-benzylamino-benzoyl)-pyridine-carboxylic acid-(3), respectively. The above isomer mixture of benzoyl-pyridine-carboxylic acids was then reacted with 2-naphthol in the same manner as described in Example 4 followed by working up the resulting reaction product to obtain the corresponding pyridine-carboxylic acid lactones in each case.

(No. 7-a)

A mixture comprising 3-[3'-(4''-chloro)-anilino-benzo(c)-11'-oxy-xanthenyl]-pyridine-carboxylic acid-(2) lactone and 2-[3'-(4''-chloro)-anilino-benzo(c)-11'-oxy-xanthenyl]-pyridine-carboxylic acid-(3) lactone. A solution of this mixture in benzene developed a red color immediately after the solution was adsorbed on acid clay.

(No. 7-b)

A mixture comprising 3-[3'-methyl)-anilino-benzo(c)-11'-oxy-xanthenyl]-pyridine-carboxylic acid-(2) lactone and 2-[3'-(4''methyl)-anilino-benzo(c)-11'-oxy-xanthenyl]-pyridine-carboxylic acid-(3) lactone. A solution of this mixture in benzene developed a red color immediately after the solution was adsorbed on acid clay.

(No. 7-c)

A mixture comprising 3-[3'-benzylamino-benzo(c)-11'-oxy-xanthenyl]-pyridine-carboxylic acid-(2) lactone and 2-[3'-benzylamino-benzo(c)-11'-oxy-xanthenyl]-pyridine-carboxylic acid-(3) lactone. A solution of this mixture in benzene developed a red color immediately after the solution was adsorbed on acid clay.

EXAMPLE 8

In the same manner as described in Example 4, (a) 4-chloro-quinolinic anhydride, (b) 4-methyl-quinolinic anhydride or (c) 6-phenyl-quinolinic anhydride in place of quinolinic anhydride was reacted with N,N-diethyl-m-phenetidine to obtain the corresponding pyridine-carboxylic acid, i.c., (a): an isomer mixture comprising 3-(2'-ethoxy-4'-diethylamino-benzoyl)-4-chloro-pyridine-carboxylic acid-(2) and 2-(2'-ethoxy-4'-diethylamino-benzoyl)-4-chloro-pyridine-carboxylic acid-(3); (b) an isomer mixture comprising 3-(2'-ethoxy-4'-diethylamino-benzoyl)-4-methyl-pyridine-carboxylic acid-(2) and 2-(2'-ethoxy-4'-diethylamino-benzoyl)-4-methyl-pyridine-carboxylic acid-(3); (c) an isomer mixture comprising 3-(2'-ethoxy-4'-diethylamino-benzoyl)-6-phenyl-pyridine-carboxylic acid-(2) and 2-(2'-ethoxy-4'-diethylamino-benzoyl)-6-phenyl-pyridine-carboxylic acid-(3), respectively. The above isomer mixture of benzoyl-pyridine-carboxylic acids was then reacted with 5-dimethylamino-2-naphthol in the same manner as described in Example 4 followed by working up the resulting reaction product to obtain the corresponding pyridine-carboxylic acid lactones in each case.

(No. 8-a)

A mixture comprising 3-[3'-diethylamino-7'-dimethylamino-benzo(c)-11'-oxy-xanthenyl]-4-chloro-pyridine-carboxylic acid-(2) lactone and 2-[3'-diethylamino-7'-dimethylamino-benzo(c)-11'-oxy-xanthenyl]-4-chloro-pyridine-carboxylic acid-(3) lactone. A solution of this mixture in benzene developed a purplish blue color immediately after the solution was adsorbed on acid clay.

(No. 8-b)

A mixture comprising 3-[3'-diethylamino-7'-dimethylamino-benzo(c)-11'-oxy-xanthenyl]-4-methyl-pyridine-carboxylic acid-(2) lactone and 2-[3'-diethylamino-7'-dimethylamino-benzo(c)-11'-oxy-xanthenyl]-4-methyl-pyridine-carboxylic acid-(3) lactone. A solution of this mixture in benzene developed a purplish blue color immediately after the solution was adsorbed on acid clay.

(No. 8-c)

A mixture comprising 3-[3'-diethylamino-7'-dimethylamino-benzo(c)-11'-oxy-xanthenyl]-6-phenyl-pyridine-carboxylic acid-(2) lactone and 2-[3'-diethylamino-7'-dimethylamino-benzo(c)-11'-oxy-xanthenyl]-6-phenyl-pyridine-carboxylic acid-(3) lactone. A solution of this mixture in benzene developed a purplish blue color immediately after the solution was adsorbed on acid clay.

EXAMPLE 9

3.1 g of an isomer mixture comprising 3-[2'-ethoxy-4'-diethylamino-benzoyl]-pyridine-carboxylic acid-(2) and 2-[2'-ethoxy-4'-diethylamino-benzoyl]-pyridine-carboxylic acid-(3) having a melting point of 245° to 253°C obtained in a similar manner to Example 1 and 1.6 g of 5-propionamido-2-naphthol were added to 30 g of 95% sulfuric acid, and the mixture was allowed to react at a temperature of from 95° to 100°C for 5 hours. After completion of the reaction, the reaction product was poured into 150 ml of ice-water, and dilute aqueous sodium hydroxide was added to the resulting solution while stirring to adjust a pH to about 11. 70 ml of benzene was then added to the mixture to transfer the pyridine-carboxylic acid lactone into the benzene layer which was then separated. The benzene was distilled off from the benzene layer, and the resulting residue was washed successively with water and a small amount of ligroin, and dried to give 3.7 g of an isomer mixture comprising 3-[3'-diethylamino-7'-propionamido-benzo(c)-11'-oxy-xanthenyl]-pyridine-carboxylic acid-(2) lactone and 2-[3'-diethylamino-7'-propionamido-benzo(c)-11'-oxy-xanthenyl]-pyridine-carboxylic acid-(3) lactone as light brown colored crystals having a melting point of 231° to 236°C. A solution of the above crystals in toluene developed a red color immediately after the solution was adsorbed on acid clay.

EXAMPLE 10

2.5 g of the isomer mixture of pyridine-carboxylic acid lactone having a melting point of 239° to 242°C designated as No. 3-d was dissolved in a mixture of 50 ml of benzene and 0.7 g of triethylamine, and 1.2 g of toluoyl chloride was added to the resulting solution. The mixture was then allowed to react for 5 hours at a temperature of from 65° to 70°C followed by allowing the mixture to cool to room temperature. The reaction product thus obtained was then washed with 50 ml of ice-water, and the benzene was distilled off to leave a residue. The resulting residue was then washed with a smal amount of petroleum ether and dried to obtain 3.2 g of an isomer mixture comprising 3-[3'-diethylamino-7'-(4''-methyl)-benzamido-benzo-(c)-11'-oxy-xanthenyl]-pyridine-carboxylic acid-(2) lactone and 2-[3'-diethylamino-7'-(4''-methyl)-benzamido-benzo(c)-11'-oxy-xanthenyl]-pyridine-carboxylic acid-(3) lactone as light reddish purple colored crystals having a melting point of 157° to 164°C. A solution of the above crystals in benzene developed a red color immediately after the solution was adsorbed on acid clay.

EXAMPLE 11

2.5 g of the isomer mixture of pyridine-carboxylic acid lactone having a melting point of 239° to 242°C obtained in a similar manner as described in Example 10 was dissolved in a mixture of 50 ml of benzene and 0.7 g of triethylamine, and each of the acid halides (11 compounds) listed in Table 3 below was added to the resulting solution followed by allowing the mixture to react for 5 hours at a temperature of from 65° to 70°C. After completion of the reaction, the reaction mixture was worked up in the same manner as described in Example 10 to obtain the following lactone in each instance. (The sample number of the resulting lactone is shown in parentheses.)

(No. 11-a)

A mixture comprising 3-[3'-diethylamino-7'-acrylamidobenzo(c)-11'-oxy-xanthenyl]-pyridine-carboxylic acid-(2) lactone and 2-[3'-diethylamino-7'-acrylamido-benzo(c)-11'-oxy-xanthenyl]-pyridine-carboxylic acid-(3) lactone.

(No. 11-b)

A mixture comprising 3-[3'-diethylamino-7'-benzamido-benzo(c)-11'-oxy-xanthenyl]-pyridine-carboxylic acid-(2) lactone and 2-[3'-diethylamino-7'-benzamido-benzo(c)-11'-oxy-xanthenyl]-pyridine-carboxylic acid-(3) lactone.

(No. 11-c)

A mixture comprising 3-[3'-diethylamino-7'-(2'',4''-dimethyl)-benzamido-benzo(c)-11'-oxy-xanthenyl]-pyridine-carboxylic acid-(2) lactone and 2-[3'-diethylamino-7'-(2'',4''-dimethyl)-benzamidobenzo(c)-11'-oxy-xanthenyl]-pyridine-carboxylic acid-(3) lactone.

(No. 11-d)

A mixture comprising 3-[3'-diethylamino-7'-(2''-methoxy)-benzamido-benzo(c)-11'-oxy-xanthenyl]-pyridine-carboxylic acid-(2) lactone and 2-[3'-diethylamino-7'-(2''-methoxy)-benzamido-benzo(c)-11'-oxy-xanthenyl]-pyridine-carboxylic acid-(3) lactone.

(No. 11-e)

A mixture comprising 3-[3'-diethylamino-7'-(3''-dimethylamino)-benzamido-benzo(c)-11'-oxy-xanthenyl]-pyridine-carboxylic acid-(2) lactone and 2-[3'-diethylamino-7'-(3''-dimethylamino)-benzamido-benzo(c)-11'-oxy-xanthenyl]-pyridine-carboxylic acid-(3) lactone.

(No. 11-f)

A mixture comprising 3-[3'-diethylamino-7'-(3'',4'',5''-trioxy)-benzamido-benzo(c)-11'-oxy-xanthenyl]-pyridine-carboxylic acid-(2) lactone and 2-[3'-diethylamino-7'-(3'',4'',5''-trioxy)-benzamido-benzo(c)-11'-oxy-xanthenyl]-pyridine-carboxylic acid-(3) lactone.

(No. 11-g)

A mixture comprising 3-[3'-diethylamino-7'-(4''-nitro)-benzamido-benzo(c)-11'-oxy-xanthenyl]-pyridine-carboxylic acid-(2) lactone and 2-[3'-diethylamino-7'-(4''-nitro)-benzamido-benzo(c)-11'-oxy-xanthenyl]-pyridine-carboxylic acid-(3) lactone.

(No. 11-h)

A mixture comprising 3-[3'-diethylamino-7'-(2'',4''-dichloro)-benzamido-benzo(c)-11'-oxy-xanthenyl]-pyridine-carboxylic acid-(2) lactone and 2-[3'-diethylamino-7'-(2'',4''-dichloro)-benzamido-benzo(c)-11'-oxy-xanthenyl]-pyridine-carboxylic acid-(3) lactone.

(No. 11-i)

A mixture comprising 3-[3'-diethylamino-7'-cinnamamido-benzo(c)-11'-oxy-xanthenyl]-pyridine-carboxylic acid-(2) lactone and 2-[3'-diethylamino-7'-cinnamamido-benzo(c)-11'-oxy-xanthenyl]-pyridine-carboxylic acid-(3) lactone.

(No. 11-j)

A mixture comprising 3-[3'-diethylamino-7'-(4''-dimethylamino)-cinnamamido-benzo(c)-11'-oxy-xanthenyl]-pyridine-carboxylic acid-(2) lactone and 2-[3'-diethylamino-7'-(4''-dimethylamino)-cinnamamido-benzo(c)-11'-oxy-xanthenyl]-pyridine-carboxylic acid-(3) lactone.

(No. 11-k)

A mixture comprising 3-[3'-diethylamino-7'-(1''-naphthoyl)-amino-benzo(c)-11'-oxy-xanthenyl]-pyridine-carboxylic acid-(2) lactone and 2-[3'-diethylamino-7'-(1''-naphthoyl)-amino-benzo(c)-11'-oxy-xanthenyl]-pyridine-carboxylic acid-(3) lactone.

Table 3

| Sample No. | Acid Halide Used and Amount | Yield (g) | Melting Point (°C) | Color of Crystals | Color Developed on Acid Clay (Solvent: Toluene) |
|---|---|---|---|---|---|
| No.11-a | Acryloyl chloride | 0.6 / 2.7 | — | pale brown | reddish purple |
| No.11-b | Benzoyl chloride | 1.0 / 3.0 | 165–169 | pale pink | reddish purple |
| No.11-c | 2,4-Dimethyl-benzoyl chloride | 1.2 / 3.1 | — | pale pink | reddish purple |
| No.11-d | 2-Methoxy-benzoyl chloride | 1.2 / 3.0 | 152–155 | pale whitish pink | reddish purple |
| No.11-e | 3-Dimethylamino-benzoyl chloride | 1.3 / 3.2 | 136–139 | pale pink | reddish purple |
| No.11-f | 3,4,5-Trioxy-benzoyl chloride | 1.3 / 3.2 | — | pale reddish purple | reddish purple |
| No.11-g | 4-Nitro-benzoyl chloride | 1.2 / 3.1 | 171–174 | pale yellow | reddish purple |
| No.11-h | 2,4-Dichloro-benzoyl chloride | 1.4 / 3.4 | 163–167 | pale pink | reddish purple |
| No.11-i | Cinnamoyl chloride | 1.2 / 3.1 | 218–225 | pale brown | reddish purple |
| No.11-j | 4-Dimethylamino-cinnamoyl chloride | 1.5 / 3.3 | — | pale brown | reddish purple |
| No.11-k | 1-Naphthoyl chloride | 1.3 / 3.2 | — | pale pink | reddish purple |

EXAMPLE 12

3.2 g of the isomer mixture of benzoyl-pyridine-carboxylic acid having a melting point of 245° to 253°C obtained in a similar manner as described in Example 1 and 2.7 g of 4-amino-1-naphthol were added to 26 g of 98% sulfuric acid. The resulting mixture was allowed to react for 5 hours at a temperature of from 90° to 95°C and then allowed to cool to room temperature followed by working up in the same manner as described in Example 2 to obtain 2.8 g of an isomer mixture comprising 3-[3'-diethylamino-9'-amino-benzo(a)-11'-oxy-xanthenyl]-pyridine-carboxylic acid-(2) lactone and 2-[3'-diethylamino-9'-amino-benzo(a)-11'-oxy-xanthenyl]-pyridine-carboxylic acid-(3) lactone as light yellowish brown crystals having a melting point of 224° to 231°C.

2.5 g of the resulting isomer mixture of pyridine-carboxylic acid lactone (m.p., 224°–231°C) was then reacted with each of the acid halides listed in Table 4 in a similar manner as described in Example 10 to obtain the following lactone in each instance. (The sample number of the resulting lactone is shown in parentheses.)

(No. 12-a)
A mixture comprising 3-[3'-diethylamino-9'-acetamido-benzo(a)-11'-oxy-xanthenyl]-pyridine-carboxylic acid-(2) lactone and 2-[3'-diethylamino-9'-acetamido-benzo(a)-11'-oxy-xanthenyl]-pyridine-carboxylic acid-(3) lactone.

(No. 12-b)
A mixture comprising 3-[3'-diethylamino-9'-(2''-methyl-5''-chloro)-benzamido-benzo(a)-11'-oxy-xanthenyl]-pyridine-carboxylic acid-(2) lactone and 2-[3'-diethylamino-9'-(2''-methyl-5''-chloro)-benzamido-benzo(a)-11'-oxy-xanthenyl]-pyridine-carboxylic acid-(3) lactone.

N-methyl-N-phenyl-m-anisidine were dissolved in 80 ml of benzene, and 18.8 g of anhydrous aluminum chloride was added to the solution with stirring over about 20 minutes at a temperature of from 20° to 35°C. After completion of the addition, the resulting mixture was allowed to react for 4 hours at a temperature of from 45° to 50°C and the reaction mixture was allowed to cool to room temperature. The benzene was removed by decantation, and the resulting reaction product was poured into 300 ml of ice-water followed by stirring. The precipitated solid was filtered, washed successively with water and a small amount of methanol and dried to obtain 13.6 g of an isomer mixture comprising 3-[2'-methoxy-4'-(N-methyl-N-phenyl)-amino-benzoyl]-pyridine-carboxylic acid-(2) and 2-[2'-methoxy-4'-(N-methyl-N-phenyl)-amino-benzoyl]-pyridine-carboxylic acid-(3) as ligh brown crystals having a melting point of from 205° to 217° C. If desired, the crystals thus obtained was purified by recrystallization.

3.6 g of the above isomer mixture of benzoyl-pyridine-carboxylic acid (m.p., 205° – 217°C) and 2.3 g of 5-acetamido-2-naphthol were added to 17 g of 98% sulfuric acid, and the mixture was allowed to react for 4 hours at a temperature of from 95° to 100°C followed by allowing to cool to room temperature. The reaction product thus obtained was then worked up in the same manner as described in Example 9 to obtain 3.4 g of an isomer mixture comprising 3-[3'-(N-methyl-N-phenyl)-amino-7'-acetamido-benzo(c)-11'-oxy-xanthenyl]-pyridine-carboxylic acid-(2) lactone and 2-[3'-(N-methyl-N-phenyl)-amino-7'-acetamido-benzo(c)-11'-oxy-xanthenyl]-pyridine-carboxylic acid-(3) lactone as light pink colored crystals having a melting point of 231° to 236°C. A solution of the above crystals in toluene developed a red color immediately after the solution was adsorbed on a phenol-aldehyde polymer.

Table 4

| Sample No. | Acid Halide Used and Amount | Yield (g) | Melting Point (°C) | Color of Crystals | Color Developed on Acid Clay (Solvent: Toluene) |
|---|---|---|---|---|---|
| No.12-a | Acetyl chloride | 0.5 / 2.7 | 246–253 | whitish green | reddish brown |
| No.12-b | 2-Methyl-5-chlorobenzoyl chloride | 1.3 / 3.0 | 183–187 | pale pink | reddish brown |

EXAMPLE 13

7.0 g of quinolinic anhydride and 14.1 g of

EXAMPLE 14

5.0 of quinolinic anhydride and 14.2 g of N,N-dibenzyl-m-anisidine were added to 60 ml of benzene, and 13.4 g of anhydrous aluminum chloride was added with stirring over about 30 minutes at a temperature of from 20° to 35°C. After completion of the addition, the mixture was allowed to react for 4 hours at a temperature of from 45° to 55°C and allowed to cool to room temperature. The reaction product thus obtained was then worked up in the same manner as described in Example 13 to obtain 10.6 g of an isomer mixture comprising 3-[2'-methoxy-4'-dibenzylamino-benzoyl]-pyridine-carboxylic acid-(2) and 2-[2'-methoxy-4'-dibenzylamino-benzoyl]-pyridine-carboxylic acid-(3) as light brown crystals having a melting point of 195° to 203°C. If desired, the resulting crystals were purified by recrystallization.

worked up in the same manner as described in Example 9 to obtain the following lactone. (The sample number of the resulting lactone is shown in parentheses.)

(No. 15-a)
A mixture comprising 3-[3'-methylamino-7'-acetamido-benzo(c)-11'-oxy-xanthenyl]-pyridine-carboxylic acid-(2) lactone and 2-[3'-methylamino-7'-acetamido-benzo(c)-11'-oxy-xanthenyl]-pyridine-carboxylic acid-(3) lactone.

(No. 15-b)
A mixture comprising 3-[3'-methylamino-9'-benzamido-benzo(a)-11'-oxy-xanthenyl]-pyridine-carboxylic acid-(2) lactone and 2-[3'-methylamino-9'-benzamido-benzo(a)-11'-oxy-xanthenyl]-pyridine-carboxylic acid-(3) lactone.

Table 5

| Sample No. | Naphthalene Compound Used and Amount | | Yield | Melting Point | Color of Crystals | Color Developed on Acid Clay (Solvent: Toluene) |
|---|---|---|---|---|---|---|
| | | (g) | (g) | (°C) | | |
| No.15-a | 5-Acetamido-2-methoxy-naphthalene | 2.4 | 2.8 | — | pale green | reddish purple |
| No.15-b | 4-Benzamido-1-naphthol | 3.0 | 3.4 | — | pale pink | red |

4.5 g of the above isomer mixture of benzoyl-pyridine-carboxylic acid (m.p., 195° – 203°C) and 2.3 g of 5-acetamido-2-naphthol were added to 25 g of 98% sulfuric acid, and the mixture was allowed to react for 5 hours at a temperature of from 90° to 100°C followed by allowing to cool to room temperature. The reaction product thus obtained was then worked up in the same manner as described in Example 9 to obtain 3.8 g of an isomer mixture comprising 3-[3'-dibenzylamino-7'-acetamido-benzo(c)-11'-oxy-xanthenyl]-pyridine-carboxylic acid-(2) lactone and 2-[3'-dibenzylamino-7'-acetamido-benzo(c)-11'-oxy-xanthenyl]-pyridine-carboxylic acid-(3) lactone as pale pink colored crystals having a melting point of 226° to 231°C. A solution of the above crystals in benzene developed a red color immediately after the solution was adsorbed on acid clay.

EXAMPLE 15

4.5 g of quinolinic anhydride and 4.0 g of 3-methylaminophenol were dissolved in 60 ml of benzene, and 10.9 g of anhydrous aluminum chloride was added to the solution with stirring over about 20 minutes at a temperature of from 20° to 30°C. After completion of the addition, the resulting mixture was allowed to react for 5 hours at a temperature of from 40° to 50°C and the resulting reaction mixture was allowed to cool to room temperature. The reaction product was then worked up in the same manner as described in Example 5 to obtain 6.2 g of an isomer mixture comprising 3-[2'-oxy-4'-methylamino-benzoyl]-pyridine-carboxylic acid-(2) and 2-[2'-oxy-4'-methylamino-benzoyl]-pyridine-carboxylic acid-(3) as pale brown crystals.

2.7 g of the isomer mixture of benzoyl-pyridine-carboxylic acid as pale brown crystals obtained above and each of the naphthalene compound listed in Table 5 below were added to 13.5 g of 95% sulfuric acid and the mixture was allowed to react at a temperature of from 90° to 100°C for 4 hours. After completion of the reaction, the reaction product thus obtained was

EXAMPLE 16

Each of (a) 4-chloro-quinolinic anhydride, (b) 4-methylquinolinic anhydride and (c) 6-phenyl-quinolinic anhydride in place of quinolinic anhydride used in Example 1 was reacted with N,N-diethyl-m-phenetidiene in the same manner as described in Example 1 to obtain the following corresponding pyridine-carboxylic acid in each instance.

a. an isomer mixture comprising 3-(2'-ethoxy-4'-diethylaminobenzoyl)-4-chloro-pyridine-carboxylic acid-(2) and 2-(2'-ethoxy-4'-diethylamino-benzoyl)-4-chloro-pyridine-carboxylic acid-(3), b. an isomer mixture comprising 3-(2'-ethoxy-4'-diethylamino-benzoyl)-4-methyl-pyridine-carboxylic acid-(2) and 2-(2'-ethoxy-4'-diethylamino-benzoyl)-4-methyl-pyridine-carboxylic acid-(3), and c. an isomer mixture comprising 3-(2'-ethoxy-4'-diethylamino-benzoyl)-6-phenyl-pyridine-carboxylic acid-(2) and 2-(2'-ethoxy-4'-diethylamino-benzoyl)-6-phenyl-pyridine-carboxylic acid-(3).

Each of the isomer mixtures of pyridine carboxylic acid thus obtained was then reacted with 5-acetamido-2-naphthol followed by working up in the same manner as described in Example 9 to obtain the following corresponding pyridine-carboxylic acid lactone in each instance.

(No. 16-a)
A mixture of 3-[3'-diethylamino-7'-acetamido-benzo(c)-11'-oxy-xanthenyl]-4-chloro-pyridine-carboxylic acid-(2) lactone and 2-[3'-diethylamino-7'-acetamido-benzo(c)-11'-oxy-xanthenyl]-4-chloro-pyridine-carboxylic acid-(3) lactone. A solution of this mixture in benzene developed a reddish purple color immediately after the solution was adsorbed on acid clay.

(No. 16-b)
A mixture of 3-[3'-diethylamino-7'-acetamido-benzo(c)-11'-oxy-xanthenyl]-4-methyl-pyridinecarboxylic acid-(2) lactone and 2-[3'-diethylamino-7'-acetamido-benzo(c)-11'-oxy-xanthenyl]-4-methyl-pyridine-carboxylic acid-(3) lactone. A solution of this mixture in benzene developed a reddish purple color immediately after the solution was adsorbed on acid clay.

(No. 16-c)

A mixture of 3-[3'-diethylamino-7'-acetamido-benzo(c)-11'-oxy-xanthenyl]-6-phenyl-pyridine-carboxylic acid-(2) lactone and 2-[3'-diethylamino-7'-acetamido-benzo(c)-11'-oxy-xanthenyl]-6-phenyl-pyridine-carboxylic acid-(3) lactone. A solution of this mixture in benzene developed a reddish purple color immediately after the solution was adsorbed on acid clay.

While the invention has been described in detail and with reference to specific embodiments thereof, it will be apparent to one skilled in the art that various changes and modifications can be made therein without departing from the spirit and scope thereof.

What is claimed is:

1. A lactone compound represented by the following formula (Ia) 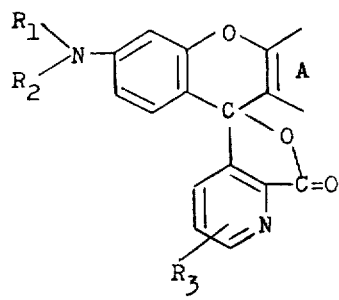

or (Ib) 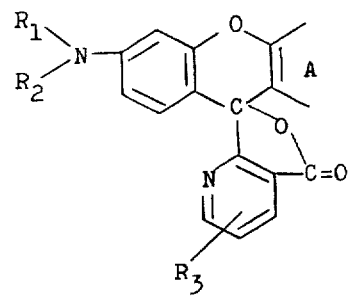

or a mixture thereof, wherein $R_1$ represents a hydrogen atom, a lower alkyl group or a benzyl group, $R_2$ represents a lower alkyl group, a benzyl group or an unsubstituted or substituted phenyl group wherein the substituent is a lower alkyl group or a halogen atom, $R_3$ represents a hydrogen atoms, a lower alkyl group, a halogen atom or a phenyl group, and the partial structure

represents a naphthalene residual group of the formula (IVa) or (IVb)

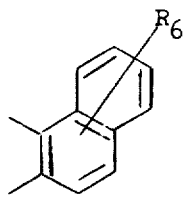 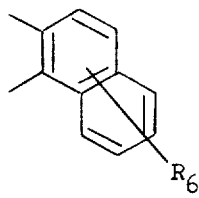

(IVa)  (IVb)

wherein $R_6$ represents a hydrogen atom, a lower alkyl group, a lower alkoxy group, a halogen atom, an amino group, a mono-lower alkylamino group, di-lower alkylamino group, a monobenzylamino group, a dibenzylamino group, an N-lower alkyl-N-benzylamino group, an anilino group, an N-lower alkylanilino group, a —NHCO—X group wherein X represents a lower alkyl group, a lower alkenyl group, or an unsubstituted or substituted styryl group, an unsubstituted or substituted phenyl group or an unsubstituted or substituted naphthyl group wherein the substituent is a lower alkyl group, a lower alkoxy group, a di-lower alkylamino group, a hydroxy group, a nitro group or a halogen atom and said lower alkyl, alkoxy and alkenyl groups have 1 to 5 carbon atoms.

2. A process for preparing a lactone compound of the formula

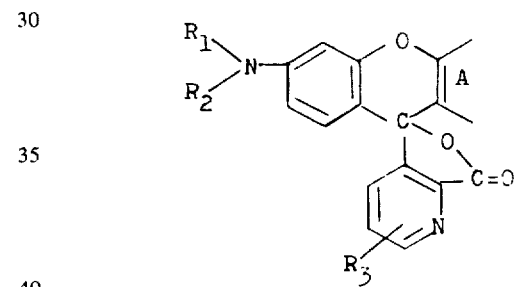

(Ia)

or

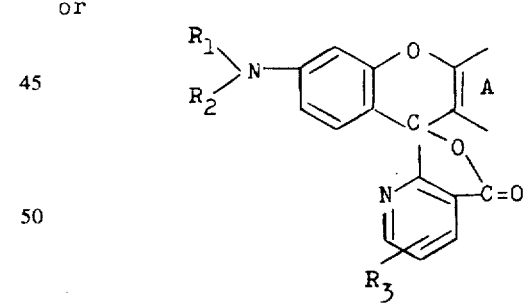

(Ib)

or a mixture thereof, wherein $R_1$ represents a hydrogen atom, a lower alkyl group or a benzyl group, $R_2$ represents a lower alkyl group, a benzyl group or an unsubstituted or substituted phenyl group wherein the substituent is a lower alkyl group or a halogen atom, $R_3$ represents a hydrogen atom, a lower alkyl group, a halogen atom or a phenyl group, and the partial structure

represents a naphthalene residual group of the formula (IVa) or (IVb)

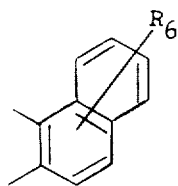 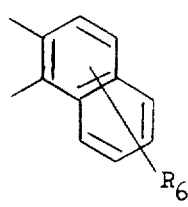

(IVa)  (IVb)

wherein R₆ represents a hydrogen atom, a lower alkyl group, a lower alkoxy group, a halogen atom, an amino group, a mono-lower alkylamino group, di-lower alkylamino group, a monobenzylamino group, a dibenzylamino group, an N-lower alkyl-N-benzylamino group, an anilino group, an N-lower alkyl anilino group, a —NHCO—X group wherein X represents a lower alkyl group, a lower alkenyl group, or an unsubstituted or substituted styryl group, an unsubstituted or substituted phenyl group or an unsubstituted or substituted naphthyl group wherein the substituent is a lower alkyl group, a lower alkoxy group, a di-lower alkylamino group, a hydroxy group, a nitro group or a halogen atom and said lower alkyl, alkoxy and alkenyl groups have 1 to 5 carbon atoms, which comprises condensing a benzoyl-pyridine-carboxylic acid represented by the formula (IIa) or (IIb)

(IIa) 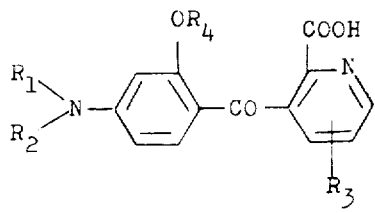

(IIb) 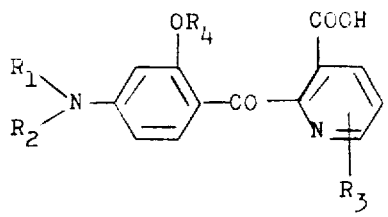

or a mixture thereof, wherein R₁, R₂ and R₃ are as defined above, and R₄ represents a hydrogen atom or a lower alkyl group, with a naphthalene compound represented by the formula (III)

(III) 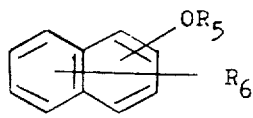

wherein R₅ represents a hydrogen atom or a lower alky group and the —OR₅ group is substituted on 1- or 2- position of the naphthalene ring, and R₆ is as defined above, at a temperature in the range of from 30° to 130°C for a period of from about 2 to about 10 hours in the presence or absence of a volatile inert organic solvent.

3. The process according to claim 2, wherein said condensing agent is concentrated sulfuric acid, acetic anhydride, phosphorus pentachloride, phosphorus oxychloride, phosphoric acid, polyphosphoric acid, zinc chloride, stannic chloride or aluminum chloride.

4. The process according to claim 2, wherein said volatile inert organic solvent is chloroform, tetrachloroethane, benzene or chlorobenzenes.

5. The process according to claim 2, wherein said napthalene compound is used in an amount of from about 1.0 to about 1.5 moles per 1 mole of said benzoyl-pyridine-carboxylic acid or a mixture thereof.

6. A process for preparing a lactone compound represented by the formula

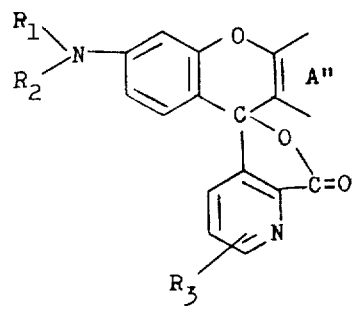

(VIIIa)

or

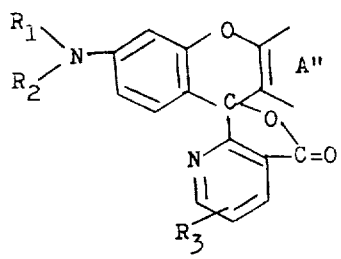

(VIIIb)

or a mixture thereof, wherein R₁ represents a hydrogen atom, a lower alkyl group or a benzyl group, R₂ represents a lower alkyl group, a benzyl group or an unsubstituted or substituted phenyl group wherein the substituent is a lower alkyl group or a halogen atom, R₃ represents a hydrogen atom, a lower alkyl group, a halogen atom or a phenyl group, and the partial structure

represents a residue of a naphthalene compound of the formula (IXa) or (IXb)

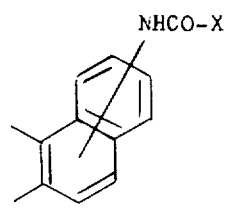 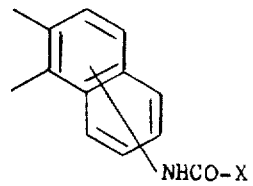

(IXa)  (IXb)

wherein X represents a lower alkyl group, a lower alkenyl group, or an unsubstituted or substituted styryl group, an unsubstituted or substituted phenyl group or an unsubstituted or substituted naphthyl group wherein the substituent is a lower alkyl group, a lower alkoxy group, a di-lower alkylamino group, a hydroxy group, a nitro group or a halogen atom and said lower alkyl, alkoxy and alkenyl group have 1 to 5 carbon atoms, which comprises condensing a pyridine-carboxylic acid lactone represented by the formula (Va) 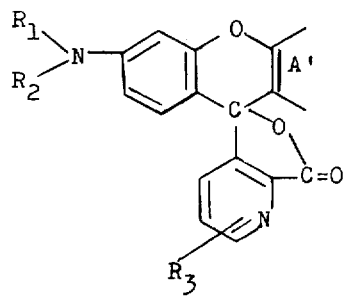

or (Vb) 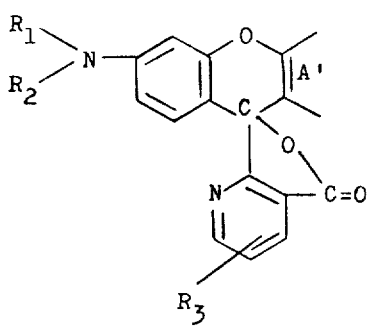

wherein $R_1$, $R_2$ and $R_3$ are as defined above, and the partial structure,

represents naphthylamine of the formula (VIa) or (VIb)

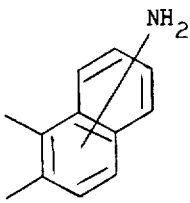 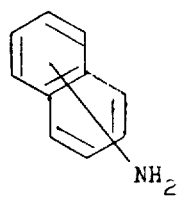

(VIa)　　　　　(VIb)

with an acid halide represented by the formula (VII)

$$X - CO - Y \qquad (VII)$$

wherein X is as defined above and Y represents a halogen atom, in a volatile inert organic solvent at a temperature in the range of from about 40° to about 110°C for a period of from about 2 to about 8 hours in the presence of an acid acceptor.

7. The process according to claim 6, wherein said volatile inert organic solvent is chloroform, benzene, toluene or chlorobenzenes.

8. The process according to claim 6, wherein said acid acceptor is triethylamine, pyridine, dimethylamine, sodium bicarbonate or sodium carbonate.

9. The process according to claim 6, wherein said acid acceptor is used in an amount of from about 1.0 to 1.5 moles per 1 mole of said pyridine-carboxylic acid lactone.

* * * * *